June 21, 1960 J. R. MIDDLEN 2,941,505
MIXING MEANS FOR LIVESTOCK FEEDING APPARATUS
Filed June 16, 1958 2 Sheets-Sheet 1
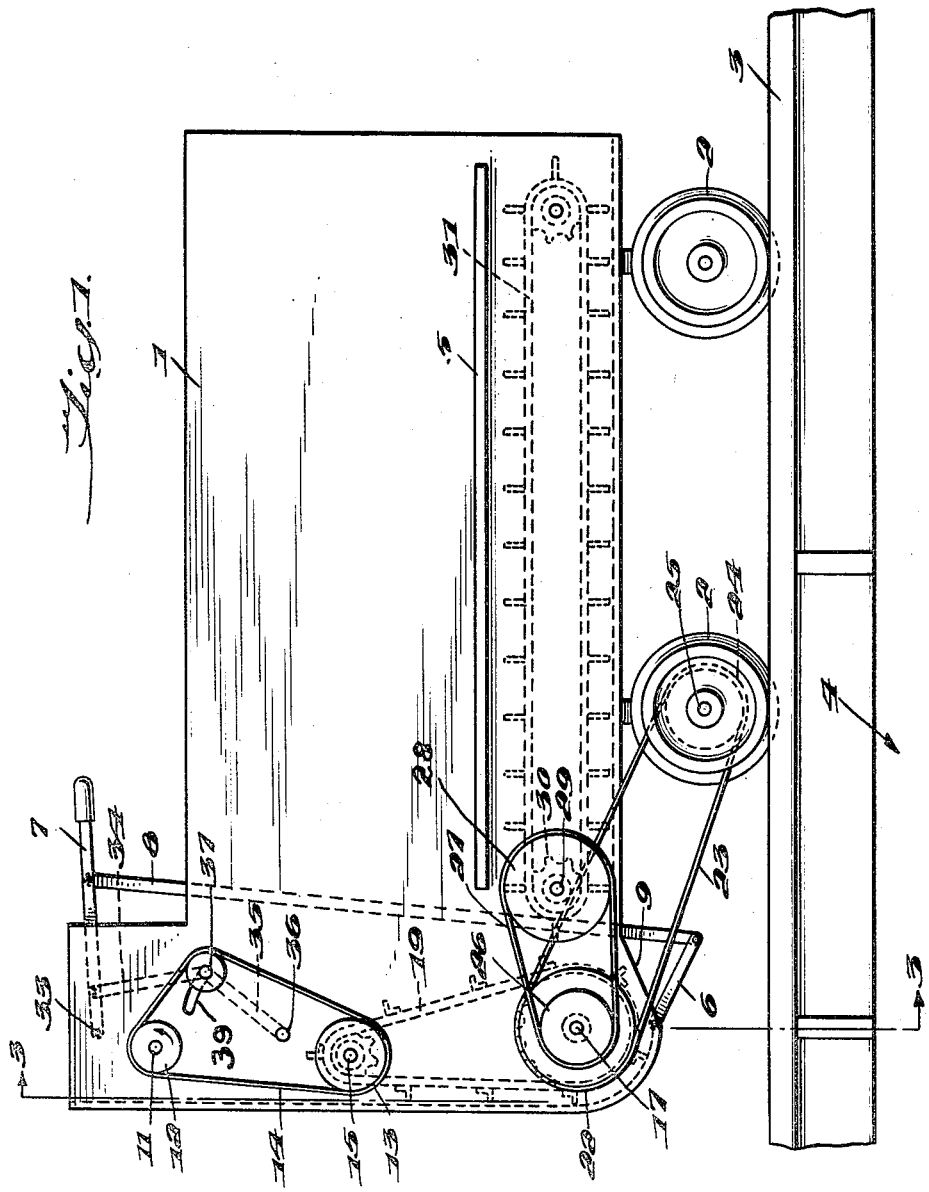
INVENTOR
Joel Middlen
BY Pierce Scheffler & Parker
ATTORNEYS June 21, 1960     J. R. MIDDLEN     2,941,505
MIXING MEANS FOR LIVESTOCK FEEDING APPARATUS
Filed June 16, 1958     2 Sheets-Sheet 2
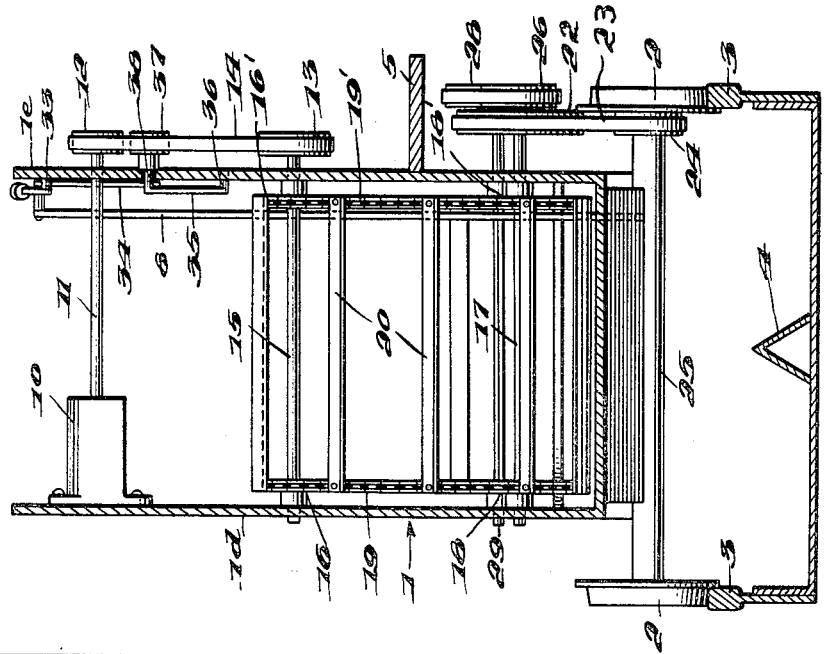
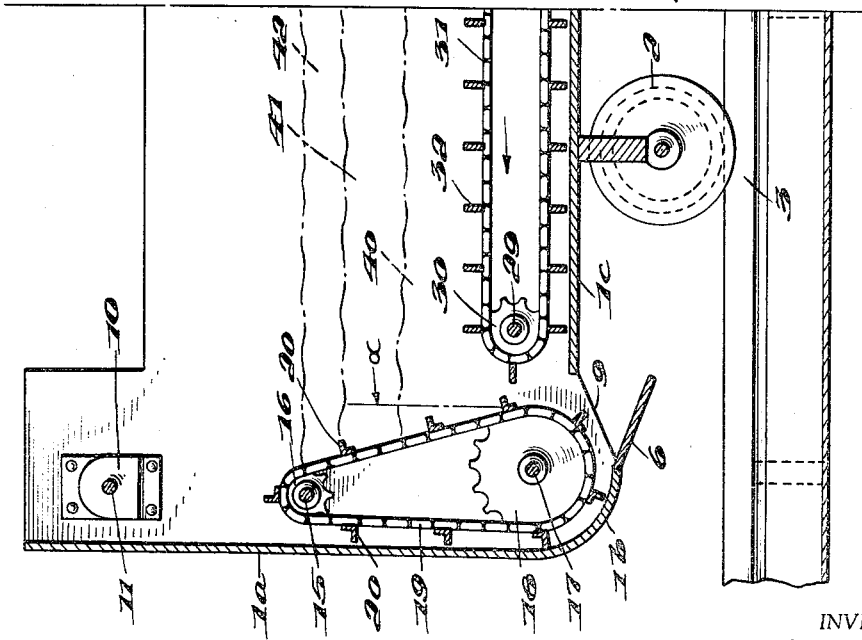
INVENTOR
Joel Middlen
BY Pierce, Scheffler & Parker
ATTORNEYS

United States Patent Office 2,941,505
Patented June 21, 1960

2,941,505
MIXING MEANS FOR LIVESTOCK FEEDING APPARATUS

Joel R. Middlen, Rte. 1, Larchwood, Iowa

Filed June 16, 1958, Ser. No. 742,327

7 Claims. (Cl. 119—51)

The present invention relates generally to livestock feed mixing means and more particularly to improved feed mixing means in a vehicular carriage operable along elevated tracks above a livestock feed trough.

In my prior U.S. Patent #2,807,234 I have disclosed a self-propelled livestock feeding apparatus in which the feed carrier travels from a silo on elevated tracks above a cattle feed trough. The feed within the carrier is conveyed by conveying means in the bottom of the carrier to rotary mixing means in the rear of the carrier after which the mixed feed is deposited from an opening in the bottom of the carrier into the feed trough as the carrier moves longitudinally thereabove.

According to my present invention, improved mixing means are positioned in the front of a self-propelled carriage for mixing the livestock feed as it is conveyed forwardly by suitable conveyor means in the bottom of the carriage. The improved mixing means have proved to be substantially as efficient as those taught in my prior patent and the present device is considerably cheaper to produce and easier to manufacture.

Thus the primary object of my invention is to provide improved means for mixing the feed in a livestock feeding apparatus travelling over an animal feed trough for depositing the mixed feed therein.

A more specific object of my invention is to provide a feed mixing device which includes means for conveying the unmixed feed horizontally above an opening in the bottom of the device and for mixing the feed by means of a plurality of transverse bars moving upwardly and forwardly in the direction of the horizontal movement of the feed.

A further object of my invention is to provide livestock feed mixing means including horizontal conveyor means for conveying unmixed feed to a point adjacent a discharge opening in the feed carriage and vertically moving horizontal agitator bars positioned above and on the other side of the opening for mixing the feed and depositing the same by gravity into said discharge opening.

Still another object of my invention is to provide livestock feed mixing means in a self-propelled carriage mounted for travel above a feed trough, said mixing means being operable only when the discharge pan in the bottom of the device is lowered to discharge the mixed feed by gravity into the trough.

Other objects and advantages of my invention will become more apparent from a study of the following description when viewed in the light of the accompanying drawings in which:

Fig. 1 is a side elevational view of my livestock feeding apparatus;

Fig. 2 is a central longitudinal sectional view of the forward portion of the apparatus; and Fig. 3 is a transverse sectional view taken along line 3—3 of Fig. 1.

Referring now to the drawings, the open-topped feed carriage 1 having supporting wheels 2 is mounted upon elevated spaced rails 3 above the livestock feed trough shown generally by the reference numeral 4. The carriage is provided with a platform 5 at one side thereof upon which the operator stands.

The vertical front wall 1a of the carriage has a curved portion 1b at the lower end thereof as shown in Fig. 2. Pivotally connected to the rear extremity of the curved portion 1b is the discharge pan 6, shown in its lowered discharging position in the figures. As will be explained in greater detail below, the discharge pan may be raised manually by means of lever 7 and link 8 to close the opening 9 in the bottom of the carriage intermediate the rear extremity of curved portion 1b and the forward edge of the carriage bottom 1c.

Rigidly connected to the carriage side wall 1d at the forward end of the carriage is the operating motor 10 haivng an output shaft 11 journalled in the opposite side wall 1e. Secured to the motor drive shaft 11 outside the carriage is a pulley 12 which drives the pulley 13 by means of the endless belt 14. Pulley 13 is secured to shaft 15 which is journalled adjacent its ends in the carriage side walls. Rigidly mounted on shaft 15 within the carriage and adjacent the side walls are a pair of spaced sprocket gears 16, 16'. Journalled in the lower front portion of the carriage adjacent the curved portion 1b is the lower shaft 17 arranged parallel to the upper shaft 15. Shaft 17 has spaced sprocket gears 18, 18' thereon and is rotatably driven by shaft 15 due to the engagement of endless sprocket chains 19, 19' with sprocket gears 16, 17 and 16', 17', respectively. It is important to note from Fig. 2 that the diameters of sprocket gears 17, 17' are larger than the diameters of sprocket gears 16, 16' so that the rear portion of the sprocket chains 19, 19' will be inclined forwardly by the angle "α" as shown. Connected at their ends to the sprocket chains 19, 19' are the parallel, spaced lifting bars 20, the function of which will be described in greater detail below.

Also secured to shaft 17 outside the carriage is a pulley 22 which by means of endless belt 23 drives pulley 24 secured to the forward axle shaft 25 to propel the carriage forwardly along the elevated track above the feed trough 4. Other known means, not shown in the drawings and forming no part of the present invention, are provided for propelling the carriage in the opposite direction.

Pulley 26 also secured to shaft 17 drives by means of endless belt 27 the pulley 28 rigidly secured to shaft 29 journalled at each end in the side walls of the carriage near the forward extremity of the bottom surface 1c thereof. Secured to shaft 29 adjacent the inner surfaces of the carriage side walls are a pair of sprocket gears 30, 30' which drive the endless conveyor 31 mounted in the bottom of the carriage. Conveyor 31 has spaced parallel projecting bars 32 thereon which engage the material to be transported forwardly in the carriage by the conveyor.

Referring to Fig. 1, linkage means are provided for tensioning the drive belt 14 simultaneously with the lowering of the discharge pan 6. When lever 7 is pivotally moved downwardly about pivot point 33 to the position shown in the drawings, pan 6 will be lowered by means of link rod 8. Simultaneously linkage rod 34 will be moved downwardly to cause linkage rod 35 (pivotally connected to the carriage side wall at pivot point 36) to pivot to the right to cause roller 37 to apply driving tension to the belt 14. Roller 37 is secured to shaft 38 which is transversely displaceable in slot 39 in the carriage side wall 1e. When lever 7 is manually pivoted upwardly about pivot point 33, rod 35 will pivot to the left about fixed pivot point 36 to move roller 37 to the left and thus remove the driving tension from drive belt 14.

The operation of the livestock feeding apparatus may now be readily described.

The open-topped carriage is filled in the silo with a layer of silage 40, a layer of grain 41, a layer of protein 42, and/or with layers of other suitable animal feed preparations (see Fig. 2). When the lever 7 is manually pivoted downwardly, the discharge pan 6 will be lowered to open the opening 9 in the bottom of the carriage and roller 37 will be moved to the right to apply tension to the drive belt 14. The motor shaft 11 will then drive pulley 13 in a counterclockwise direction to effect rotation of horizontal shaft 15 of the endless belt vertical discharge agitating means. Rotation of shaft 15 in the counterclockwise direction will cause rotation of shaft 17 by the sprocket chains 19, 19'. Rotation of shaft 17 will also cause shaft 29 to be driven in the counterclockwise direction so that the upper surface of the endless conveyor 31 will move forwardly.

As the layers of feed in the carriage are conveyed horizontally forwardly by means of the conveyor 31 to a point above the opening 9 and the discharge pan 6, the transverse mixing bars 20 will cause the forward edge portions of the forwardly moving feed layers to be lifted to a small degree and to be mixed by the spaced mixing bars 20. Due to the forward inclination of the rear vertical surface of the sprocket endless chains 19 (in view of the fact that the diameter of the sprocket gears 16 is less than the diameter of the sprocket gears 18), the feed will be broken up and mixed by the upwardly moving bars 20 and will fall by gravity downwardly between the vertically moving bars. The feed will fall upon the curved portion 1b of the carriage front wall and will be discharged upon pan 6 and through the opening 9, and thence will fall by gravity into the longitudinal feed trough 4.

It is important to point out that the curvature of the lower portion 1b of the carriage front wall conforms with the peripheries of the sprocket gears 18 and that the sprocket gears 18 are positioned quite close to the inner surface of said curved portion. Also the sprocket gears 16 and 18 are so arranged within the carriage that the front portions of the endless chains 19 will be substantially parallel to and adjacent the front wall 1a of the carriage. Consequently the transverse bars 20 on the forward vertical portion of the endless chains 19 will move downwardly quite near but spaced from the forward wall of the carriage upon counterclockwise rotation of the sprocket gears 16 and 18 to assist in moving the mixed grain downwardly and rearwardly toward the discharge opening 9.

When the lever 7 is manually pivoted upwardly about the pivot 33, the discharge pan 6 will be moved upwardly to close the opening 9 in the bottom of the carriage and the tension of drive belt 14 by the roller 37 will be released to disconnect the operation of the endless conveyor 31 and the vertically moving mixing bars 20. The feed carriage may then be returned to the silo.

While I have illustrated the forward axle 25 of the wheels 2 as being driven by belt 23 from the shaft 17, it is apparent that the axle 25 may be driven by belt means directly from the motor output shaft 11 so that upon reversal of the direction or rotation of the motor, the carriage may be propelled in the opposite direction. Alternately, reversing belt means or reversible transmission means may be provided for driving axle 17 in the opposite direction to propel the carriage in the opposite direction along the elevated tracks 3.

It is also possible to provide the bars 20 with sharp lateral projections to further assist in the mixing of the feed.

While in accordance with the patent statutes I have illustrated and described the preferred working embodiment of my invention now known to me, it will be apparent to those skilled in the art that other changes and embodiments might well be made in the embodiment disclosed without deviating from my invention as set forth in the appended claims.

I claim:

1. In a livestock feeding apparatus having a carriage mounted on elevated tracks for longitudinal movement above an animal feeding trough, said carriage containing mixing means for mixing the feed in the carriage, conveying means for conveying the unmixed feed to said mixing means, and a discharge opening in the bottom of said carriage through which the mixed feed is deposited by gravity into the feeding trough; the improvement wherein said conveying means consists of a horizontal endless conveyor terminating adjacent one edge of said opening in the carriage bottom, and said mixing means comprises a lower shaft journalled in opposite side walls of said carriage above said opening, a first pair of sprocket gears secured to said lower shaft, an upper shaft parallel to said lower shaft and journalled in opposite side walls of said carriage above said lower shaft, a second pair of sprocket gears secured to said upper shaft, a pair of endless sprocket chains drivingly connecting said second sprocket gears with said first sprocket gears respectively, a plurality of spaced lifting bars connected intermediate said sprocket chains, said second pair of sprocket gears having diameters smaller than the diameters of said first pair of sprocket gears and said upper and lower shafts being arranged so that the vertical portions of said sprocket chains on the side thereof adjacent the conveying means are inclined vertically away from said conveying means, and means for driving said sprocket chains in a direction to cause the vertical portions of said sprocket chains on the side thereof adjacent the conveying means to move upwardly to cause said transverse bars to mix the feed being fed toward the opening by said conveying means, whereby the mixed feed will fall by gravity through said bars toward said opening.

2. Apparatus as defined in claim 1 wherein said upper and lower shafts are so arranged that the vertical portions of said sprocket chains on the sides thereof opposite the inclined chain sides adjacent said conveying means are substantially vertical, and further wherein said carriage includes a front wall adjacent and parallel to said substantially vertical chain sides.

3. Apparatus as defined in claim 2 wherein the lower portion of said carriage front wall has a rearwardly curved configuration terminating at the edge of the opening in the bottom of the carriage, said front wall curved portion corresponding in configuration and being spaced from said first pair of sprocket gears.

4. Apparatus as defined in claim 3 and further including a distributing pan beneath said carriage pivotally connected at one side to the rear extremity of said front wall curved portion, and manual means for simultaneously pivotally raising said distributing pan to close the opening in the bottom of said carriage and for disconnecting said means driving said sprocket chains.

5. Apparatus as defined in claim 4 wherein said conveying means are operatively driven by said lower shaft.

6. Apparatus as defined in claim 4 and further including means driven by said lower shaft for propelling said carriage along said tracks.

7. Apparatus as defined in claim 4 wherein said means for driving said sprocket chains includes a motor-driven endless belt, the driving tension of said belt being released by said manual means when said distributing pan is pivotally raised to close the opening in the bottom of said carriage.

References Cited in the file of this patent

UNITED STATES PATENTS

| | | |
|---|---|---|
| 2,522,449 | Inman | Sept. 12, 1950 |
| 2,563,321 | Dugan | Aug. 7, 1951 |
| 2,807,234 | Middlen | Sept. 24, 1957 |